(12) United States Patent
Ogasawara et al.

(10) Patent No.: US 8,640,843 B2
(45) Date of Patent: Feb. 4, 2014

(54) HYDRAULIC CLUTCH DEVICE

(75) Inventors: Atsushi Ogasawara, Wako (JP); Junya Watanabe, Wako (JP); Masahiko Tsuchiya, Wako (JP); Akio Ooishi, Hamamatsu (JP); Makoto Kataoka, Hamamatsu (JP); Katsu Yoshimoto, Hamamatsu (JP)

(73) Assignees: Honda Motor Co., Ltd., Tokyo (JP); Kabushiki Kaisha F.C.C., Shizuoka (JP)

( * ) Notice: Subject to any disclaimer, the term of this patent is extended or adjusted under 35 U.S.C. 154(b) by 336 days.

(21) Appl. No.: 12/950,067

(22) Filed: Nov. 19, 2010

(65) Prior Publication Data

US 2011/0127137 A1    Jun. 2, 2011

(30) Foreign Application Priority Data

Nov. 27, 2009  (JP) .................................. 2009-270262

(51) Int. Cl.
  *F16D 25/08*  (2006.01)
(52) U.S. Cl.
  USPC .................. 192/85.25; 192/85.39; 192/106 F
(58) Field of Classification Search
  USPC .......................................... 192/85.25, 85.39
  See application file for complete search history.

(56) References Cited

U.S. PATENT DOCUMENTS

| | | | |
|---|---|---|---|
| 5,439,088 A | 8/1995 | Michioka et al. | |
| 6,364,781 B2 * | 4/2002 | Kundermann | 464/185 |
| 7,104,381 B2 * | 9/2006 | Miyazaki et al. | 192/48.611 |

| | | | |
|---|---|---|---|
| 2008/0264754 A1 | 10/2008 | Ogasawara et al. | |
| 2008/0296082 A1 | 12/2008 | Ogasawara et al. | |
| 2010/0072019 A1 | 3/2010 | Ogasawara | |

FOREIGN PATENT DOCUMENTS

| | | |
|---|---|---|
| CN | 101293480 A | 10/2008 |
| CN | 101315107 A | 12/2008 |
| CN | 101501358 A | 8/2009 |
| EP | 2 068 030 A1 | 6/2009 |
| GB | 2 264 152 A | 8/1993 |
| JP | S54-163257 U | 11/1979 |
| JP | S61-69099 U | 5/1986 |
| JP | 08-277852 A | 10/1996 |
| JP | 2004-156653 A | 6/2004 |
| JP | 2006-292109 A | 10/2006 |
| JP | 2007-127195 A | 5/2007 |

* cited by examiner

*Primary Examiner* — David D Le
*Assistant Examiner* — Ryan Dodd
(74) *Attorney, Agent, or Firm* — Carrier Blackman & Associates, P.C.; William D. Blackman; Joseph P. Carrier

(57) ABSTRACT

In a first hydraulic clutch device 36 provided with a first clutch inner 84, a pressure bearing plate portion 84D disposed on the first clutch inner 84 opposing driving and driven friction plates 85 and 86, a clutch piston 91 that is consecutively disposed to a pressurizing plate portion 91D and moves to the side to pressurize the driving and driven friction plates 85 and 86 in accordance with an increase in a hydraulic pressure in a control hydraulic chamber 96, a piston guide 92 that forms a control hydraulic chamber 96 between itself and the clutch piston 91, and a canceller plate 93 that forms a hydraulic canceller chamber 97 on the side opposite to the control hydraulic pressure chamber 96, a projection portion 133 of the canceller plate 93 and a notch portion 122 disposed in the piston guide 92 and engaged with the projection portion 133 are engaged with each other and assembled, and a clip 135 that is engaged with an engagement groove 123 of the notch portion 122 and regulates axial movement of the canceller plate 93 is disposed.

13 Claims, 9 Drawing Sheets

HYDRAULIC CLUTCH DEVICE

INCORPORATION BY REFERENCE

The present application claims priority under 35 U.S.C. §119 to Japanese Patent Application No. 2009-270262 filed on Nov. 27, 2009. The contents of the applications are incorporated herein by reference in its entirety.

BACKGROUND OF THE INVENTION

1. Field of the Invention

The present invention relates to a hydraulic clutch device provided with a canceller plate that forms a hydraulic canceller chamber.

2. Description of the Related Art

Hitherto, in a hydraulic clutch device, a canceller plate in which a hydraulic canceller chamber is formed between the canceller plate and a clutch piston slidably fitted in a clutch hub is locked by the clutch hub with a clip engaged with an outer periphery of the clutch hub (for example, JP-A-8-277852).

However, in the above prior-art hydraulic clutch device, it is likely that the clip is deformed by a centrifugal force and the clip is removed if a rotation number of the clutch hub is increased, so there is a need to increase a binding force of the clip. Thus, during an assembling work, the work should be performed against the large binding force of the clip, which causes a problem in workability of assembling.

The present invention has been implemented in view of the above circumstances and has an object to improve workability of assembling in a hydraulic clutch device provided with a canceller plate.

SUMMARY OF THE INVENTION

In order to achieve the above object, the present invention is characterized in that, in a hydraulic clutch device including a clutch outer, a clutch inner coaxially surrounded by the clutch outer, a plurality of friction plates, a clutch piston that sandwiches the friction plates together with either one of the clutch inner or the clutch outer and moves to the side to pressurize the friction plates in accordance with an increase in a hydraulic pressure in a control hydraulic chamber, a clutch piston guide provided so that the control hydraulic chamber is formed between the clutch piston guide and the clutch piston, and a canceller plate that forms a hydraulic canceller chamber on the side opposite to the control hydraulic chamber across the clutch piston, the canceller plate has a projection portion disposed on an inner peripheral end thereof and the clutch piston guide has a notch portion disposed at the end thereof, the projection portion and the notch portion being engaged with each other and assembled, and a locking tool that is disposed and engaged in an inner peripheral groove of the projection portion and regulates axial movement of the canceller plate with respect to the clutch piston guide.

According to this configuration, since the locking tool that regulates the movement of the canceller plate is disposed in engagement with the inner peripheral groove of the projection portion in the clutch piston guide so that the locking tool is supported by the inner peripheral groove from the outer peripheral side, the locking tool is not removed by the centrifugal force when the clutch piston guide is rotated. Thus, the binding force of the locking tool can be made smaller, and the workability of assembling of the hydraulic clutch device can be improved.

Also, in the above configuration, the locking tool may be a linear spring.

According to this configuration, since the locking tool is a linear spring, the locking tool can be deflected and easily assembled, and weight reduction can be promoted.

Also, the locking tool may have an engagement hook portion that is inserted into an engagement hole formed in the inner peripheral face of the canceller plate.

In this case, by inserting the engagement hook portion of the locking tool into the engagement hole of the canceller plate, the position of the locking tool can be regulated, and a detent of the locking tool can be disposed with a simple structure.

Also, a base circle of the projection portion may be set larger than the outer diameter of a portion where the clutch piston guide is engaged with the canceller plate.

In this case, since the base circle of the projection portion of the canceller plate is larger than the outer diameter of the portion where the clutch piston guide is engaged with the canceller plate, a space is formed between the base circle and the clutch piston guide, and operating oil in the hydraulic canceller chamber can pass through the space. Thus, there is no need to particularly provide an oil path through which the operating oil in the hydraulic canceller chamber passes, and the structure can be simplified.

Also, the notch portion may have a void where the projection portion is not engaged.

In this case, since the void with which the projection portion of the canceller plate is not engaged is disposed, the operating oil in the hydraulic canceller chamber can pass through this void, and the operation oil in the hydraulic canceller chamber can be made to pass easily.

Also, a thickness of the projection portion may be formed thinner than an interval between the end of the clutch piston guide and the locking tool.

In this case, since the thickness of the projection portion is formed thinner than the interval between the end of the clutch piston guide and the locking tool, the operating oil can pass through the notch portion and flow in/out of the hydraulic canceller chamber. Thus, there is no need to particularly provide an oil path through which the operating oil in the hydraulic canceller chamber passes, and the structure can be simplified.

Moreover, the friction plates may include a plurality of first friction plates engaged with the clutch outer incapable of relative rotation and a plurality of second friction plates arranged alternately overlapping the first friction plates and engaged with the clutch inner incapable of relative rotation, the clutch piston may have a pressurizing plate portion, and a pressure bearing plate portion may be disposed on either one of the clutch inner or the clutch outer so that the first and second friction plates arranged mutually overlapping are sandwiched between the pressure bearing plate portion and the pressurizing plate portion.

In the hydraulic clutch device according to the present invention, since the locking tool that regulates movement of the canceller plate is disposed in engagement with the inner peripheral groove of the projection portion of the clutch piston guide, the locking tool is not removed by the centrifugal force when the clutch piston guide is rotated. Thus, the binding force of the locking tool can be made smaller, and the workability of assembling of the hydraulic clutch device can be improved.

Also, since the locking tool is a linear spring, the locking tool can be deflected and easily assembled, and weight reduction can be promoted.

Also, by inserting the engagement hook portion of the locking tool into the engagement hole of the canceller plate, the position of the locking tool can be regulated, and a detent of the locking tool can be provided with a simple structure.

Moreover, since the base circle of the projection portion of the canceller plate is larger than the outer diameter of the portion where the clutch piston guide is engaged with the canceller plate, a space is formed between the base circle and the clutch piston guide, and the operating oil in the hydraulic canceller chamber can pass through this space. Therefore, there is no need to particularly dispose an oil path through which the operating oil of the hydraulic canceller chamber is made to pass, and the structure can be simplified.

Furthermore, since a void with which the projection portion of the canceller plate is not engaged is disposed, the operating oil of the hydraulic canceller chamber can pass through this void, and the operating oil of the hydraulic canceller chamber can be made to pass easily.

In addition, since the thickness of the projection portion is formed thinner than the interval between the end of the clutch piston guide and the locking tool, the operating oil can pass through the notch portion and flow in/out of the hydraulic canceller chamber. Thus, there is no need to particularly provide an oil path through which the operating oil in the hydraulic canceller chamber passes, and the structure can be simplified.

DETAILED DESCRIPTION OF THE PREFERRED EMBODIMENTS

A hydraulic clutch device according to an embodiment of the present invention will be described below referring to the attached drawings.

Figure 1:
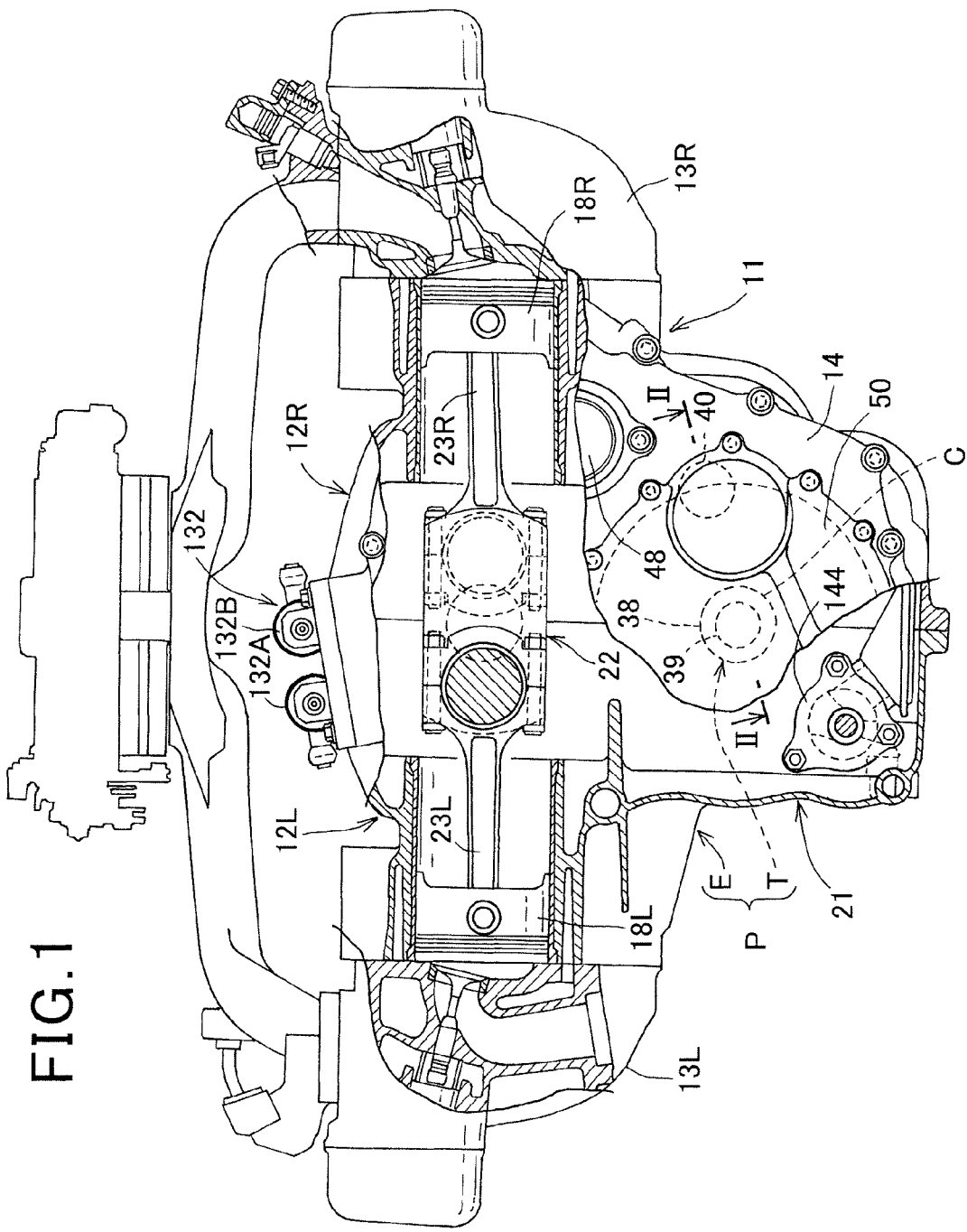
FIG. 1 is a partially cutaway rear view of a power unit according to an embodiment of the present invention.

FIG. 1 is a partially cutaway rear view of a power unit according to an embodiment of the present invention.

As shown in FIG. 1, a power unit P mounted on a motorcycle, for example, has a multi-cylinder horizontally opposed engine E, which is a four-cycle engine, and a transmission T that changes power of the engine E. The transmission T has a hydraulic clutch mechanism C.

An engine main body 11 of the engine E is provided with a left engine block 12L arranged on the left side in a state oriented to the front in the driving direction of the motorcycle, a right engine block 12R arranged on the right side in a state oriented to the front in the driving direction, left and right cylinder heads 13L and 13R joined to both outer ends of the left and right engine blocks 12L and 12R, and a rear case 14 joined to the left and right engine blocks 12L and 12R. The rear case 14 is joined to a rear part of a crank case 21 along the driving direction of the motorcycle.

Each of pistons 18L and 18R of the both engine blocks 12L and 12R is commonly connected to a crank shaft 22 whose axial line follows the longitudinal direction of the motorcycle through connecting rods 23L and 23R, and the crank shaft 22 is rotatably supported by the crank case 21.

On an upper face of the rear case 14, a clutch actuator 132 that switches a hydraulic pressure to the clutch mechanism C between action and cancellation is disposed.

In a lower part in the crank case 21, an oil pump 144 is contained, and the oil pump 144 is driven in conjunction with rotation of the crank shaft 22. Oil (operating oil) discharged from the oil pump 144 is led to the side of the clutch actuator 132 through an oil filter 139 disposed on a clutch cover 50. The clutch actuator 132 has a first electromagnetic control valve 132A and a second electromagnetic control valve 132B operating independently of each other.

Figure 2:
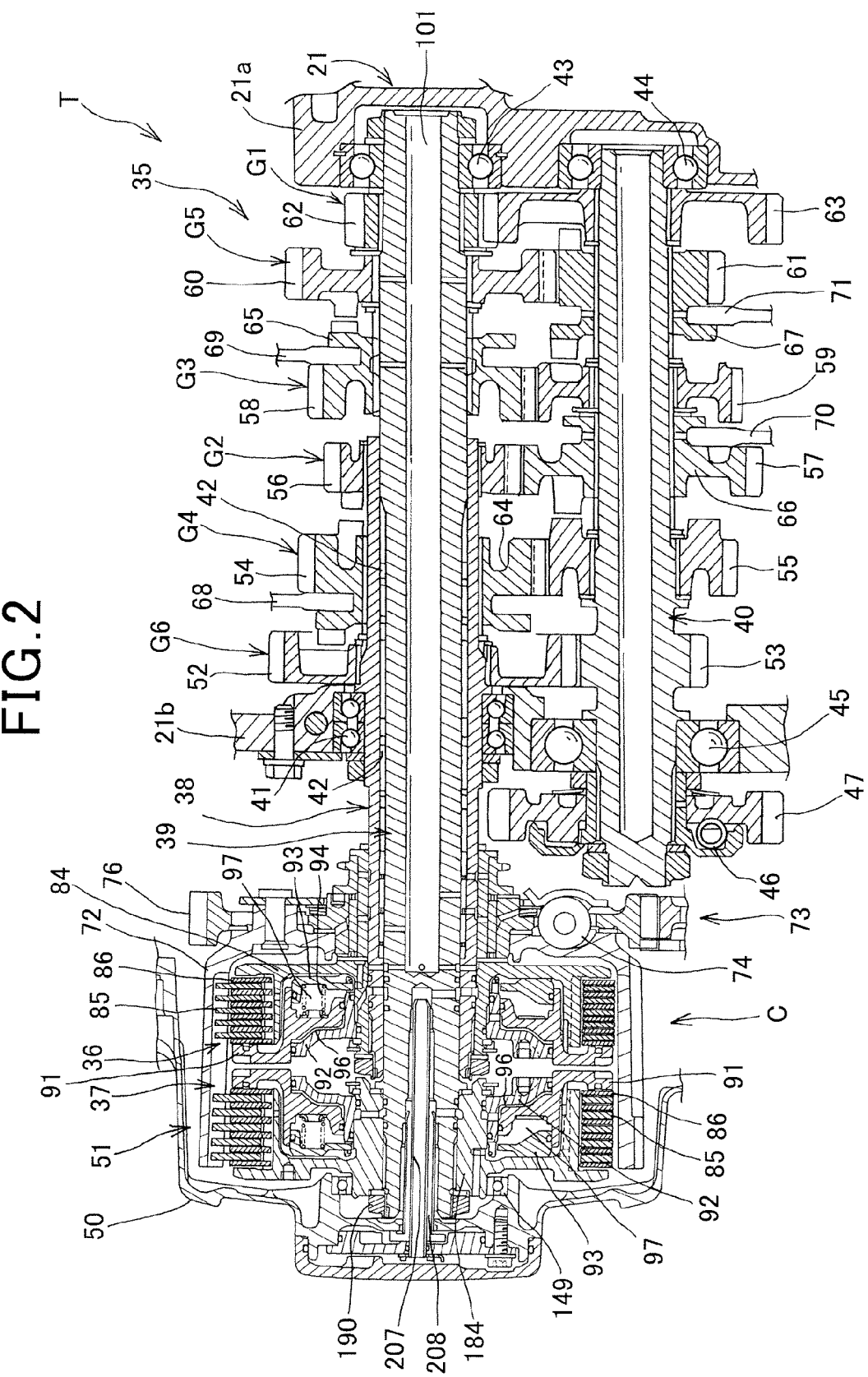
FIG. 2 is a II-II sectional view of FIG. 1.

FIG. 2 is a II-II sectional view of FIG. 1.

As shown in FIG. 2, the transmission T has a gear transmission mechanism 35 and the clutch mechanism C disposed between the gear transmission mechanism 35 and the crankshaft 22 (See FIG. 1), and the clutch mechanism C has first and second hydraulic clutch devices 36 and 37. The first and second hydraulic clutch devices 36 and 37 are installed in the middle of a power transmission path that transmits rotational power of the crank shaft 22 to a rear wheel (not shown).

The gear transmission mechanism 35 is provided with gear trains of a plurality of gear stages that can be selectively established, for example, gear trains G1, G2, G3, G4, G5, and G6 of first to sixth speeds and is contained in the crank case 21. The second, fourth, and sixth speed gear trains G2, G4, and G6, which are the transmission gear trains on the even stages, are disposed between a first main shaft 38 and a counter shaft 40. The first, third, and fifth speed gear trains G1, G3, and G5, which are the transmission gear trains on odd stages, are disposed between a second main shaft 39 disposed coaxially in the first main shaft 38 and the counter shaft 40. Also, the first main shaft 38, the second main shaft 39, and the counter shaft 40 are disposed in parallel with the crank shaft 22.

The crank case 21 includes a pair of front and rear side walls 21a and 21b opposing each other at an interval in a direction along the axial line of the crank shaft 22, that is, in the longitudinal direction of the motorcycle.

The first main shaft 38 formed cylindrically has its one end located in an intermediate portion between the front side wall 21a and the rear side wall 21b so as to be pivotally supported by the second main shaft 39 and the other end extending while penetrating the rear side wall 21b and rotatably supported on the rear side wall 21b through a ball bearing 41.

The second main shaft 39 is formed with a smaller diameter than the first main shaft 38 and penetrates the cylindrical first main shaft 38 and is disposed so as to be capable of relative rotation with respect to the first main shaft 38 and its relative location in the axial direction with respect to the first main shaft 38 being constant. Between the first main shaft 38 and the second main shaft 39, a plurality of needle bearings 42 are installed. Also, a one end portion of the second main shaft 39 is rotatably supported by the front side wall 21a of the crank case 21 through a ball bearing 43.

A one end portion of the counter shaft 40 is rotatably supported by the front side wall 21a through a ball bearing 44, while the other end portion of the counter shaft 40 is rotatably supported through a ball bearing 45 disposed on the rear side wall 21b. Also, the other end portion of the counter shaft 40 penetrates the rear side wall 21b and extends, and a gear 47 is attached to a projection end portion from the rear side wall 21b through a damper spring 46.

A drive shaft 48 (See FIG. 1) disposed in parallel with the counter shaft 40 rotatably penetrates the rear case 14 and extends rearward in order to transmit power to the rear wheel side, and a gear transmission mechanism including the gear 47 is disposed between the counter shaft 40 and the drive shaft 48.

In the rear case 14, the clutch cover 50 covering the clutch mechanism C from outside is disposed, and in a clutch chamber 51 formed in the clutch cover 50, the first and second hydraulic clutch devices 36 and 37 are contained.

Between the first main shaft 38 and the counter shaft 40, the gear train G6 for the sixth speed, the gear train G4 for the fourth speed, and the gear train G2 for the second speed are disposed so as to be aligned in the order from the first and second hydraulic clutch devices 36 and 37 side. The gear train G6 for the sixth speed has a driving gear 52 for the sixth speed supported by the first main shaft 38 capable of relative rotation and a driven gear 53 for the sixth speed disposed integrally with the counter shaft 40 and meshed with the driving gear 52 for the sixth speed, the gear train G4 for the fourth speed has a driving gear 54 for the fourth speed supported by the first main shaft 38 incapable of relative rotation while enabling axial movement and a driven gear 55 for the fourth speed supported by the counter shaft 40 capable of relative rotation and meshed with the driving gear 54 for the fourth speed, and the gear train G2 for the second speed has a driving gear 56 for the second speed supported by the first main shaft 38 capable of relative rotation and a driven gear 57 for the second speed supported by the counter shaft 40 incapable of relative rotation while enabling axial movement and meshed with the driving gear 56 for the second speed.

Between the projection portion of the second main shaft 39 from one end of the first main shaft 38 and the counter shaft 40, the gear train G3 for the third speed, the gear train G5 for the fifth speed, and the gear train G1 for the first speed are disposed so as to be aligned in the order from the first and second hydraulic clutch devices 36 and 37 side. The gear train G3 for the third speed has a driving gear 58 for the third speed supported by the second main shaft 39 incapable of relative rotation while enabling axial movement and a driven gear 59 for the third speed supported by the counter shaft 40 capable of relative rotation and meshed with the driving gear 58 for the third speed, the gear train G5 for the fifth speed has a driving gear 60 for the fifth speed supported by the second main shaft 39 capable of relative rotation and a driven gear 61 for the fifth speed supported by the counter shaft 40 incapable of relative rotation while enabling axial movement and meshed with the driving gear 60 for the fifth speed, and the gear train G1 for the first speed is composed of a driving gear 62 for the first speed joined to the second main shaft 39 incapable of relative rotation and a driven gear 63 for the first speed supported by the counter shaft 40 capable of relative rotation and meshed with the driving gear 62 for the first speed.

Between the driving gear 52 for the sixth speed and the driving gear 56 for the second speed in the first main shaft 38, a first shifter 64 capable of switching among a state engaged with the driving gear 52 for the sixth speed, a state engaged with the driving gear 56 for the second speed, and a state not engaged with either of the driving gear 52 for the sixth speed or the driving gear 56 for the second speed is supported incapable of relative rotation and capable of axial movement. In this first shifter 64, the driving gear 54 for the fourth speed is integrally disposed.

Also, between the driving gear 56 for the second speed and the driving gear 60 for the fifth speed in the second main shaft 39, a second shifter 65 capable of switching between engagement and disengagement with and from the driving gear 60 for the fifth speed is supported incapable of relative rotation and capable of axial movement. In this second shifter 65, the driving gear 58 for the third speed is integrally disposed.

Between the driven gear 55 for the fourth speed and the driven gear 59 for the third speed in the counter shaft 40, a third shifter 66 capable of switching between engagement and disengagement with and from the driven gear 55 for the fourth speed is supported incapable of relative rotation and capable of axial movement. In this third shifter 66, the driven gear 57 for the second speed is integrally disposed.

Between the driven gear 59 for the third speed and the driven gear 63 for the first speed in the counter shaft 40, a fourth shifter 67 capable of switching among a state engaged with the driven gear 59 for the third speed, a state engaged with the driven gear 63 for the first speed, and a state not engaged with either of the driven gear 59 for the third speed and the driven gear 63 for the first speed is supported incapable of relative rotation and capable of axial movement. In this fourth shifter 67, the driven gear 61 for the fifth speed is integrally disposed.

Then, by engaging the fourth shifter 67 with the driven gear 63 for the first speed, the gear train G1 for the first speed is established, by engaging the first shifter 64 with the driving gear 56 for the second speed in a state in which the third shifter 66 is not engaged with the driven gear 55 for the fourth speed, the gear train G2 for the second speed is established, and by engaging the fourth shifter 67 with the driven gear 59 for the third speed in a state in which the second shifter 65 is not engaged with the driving gear 60 for the fifth speed, the gear train G3 for the third speed is established.

Also, by engaging the third shifter 66 with the driven gear 55 for the fourth speed in a state in which the first shifter 64 is not engaged with the driving gears 56 and 52 for the second and sixth speeds, the gear train G4 for the fourth speed is established, by engaging the second shifter 65 with the driving gear 60 for the fifth speed in a state in which the fourth shifter 67 is not engaged with the driven gears 63 and 59 for the first and third speeds, the gear train G5 for the fifth speed is established, and by engaging the first shifter 64 with the driving gear 52 for the sixth speed, the gear train G6 for the sixth speed is established.

The first to fourth shifters 64 to 67 are rotatably held by first to fourth shift forks 68, 69, 70, and 71, and when the shift forks 68 to 71 are driven in the axial direction of the both main shafts 38 and 39 and the counter shaft 40, the first to fourth shifters 64 to 67 are operated in the axial direction.

In this embodiment, a transmission operation of the transmission T is controlled by an ECU disposed in the motorcycle, and during driving of the motorcycle, for example, in the first and second hydraulic clutch devices 36 and 37, only one hydraulic clutch device corresponding to the current shift position is brought into an engaged state, while the other is in a disengaged state. As a result, power is transmitted through one of the first main shaft 38 and the second main shaft 39 and any one of the gear trains G1 to G6 for the first to sixth speeds. In order to shift a gear, the ECU creates a state in which power can be transmitted using a gear train corresponding to the subsequent shift position and controls the operations of the first and second hydraulic clutch devices 36 and 37.

Specifically, if the current shift position (shift stage) is an odd stage (or an even stage), for example, the subsequent shift position will be an even stage (or an odd stage), and thus, a state in which power can be transmitted using the gear train of the even stage (or the odd stage) is created in advance. At this time, though the second hydraulic clutch device 37 (or the first hydraulic clutch device 36) is in the engaged state, the first hydraulic clutch device 36 (or the second hydraulic clutch device 37) is in the disengaged state, and the rotational power of the crank shaft 22 is not transmitted to the first main shaft 38 and the gear train of the even stages (or odd stages). After that, when the ECU determines that the shift timing is reached, it brings the second hydraulic clutch device 37 (or the first hydraulic clutch device 36) into the disengaged state and brings the first hydraulic clutch device 36 (or the second hydraulic clutch device 37) into the engaged state, whereby switching is made to the power transmission using the gear train corresponding to the subsequent shift position selected in advance. As a result, rapid and smooth transmission without causing a time lag or interruption during the transmission can be achieved.

Figure 3:
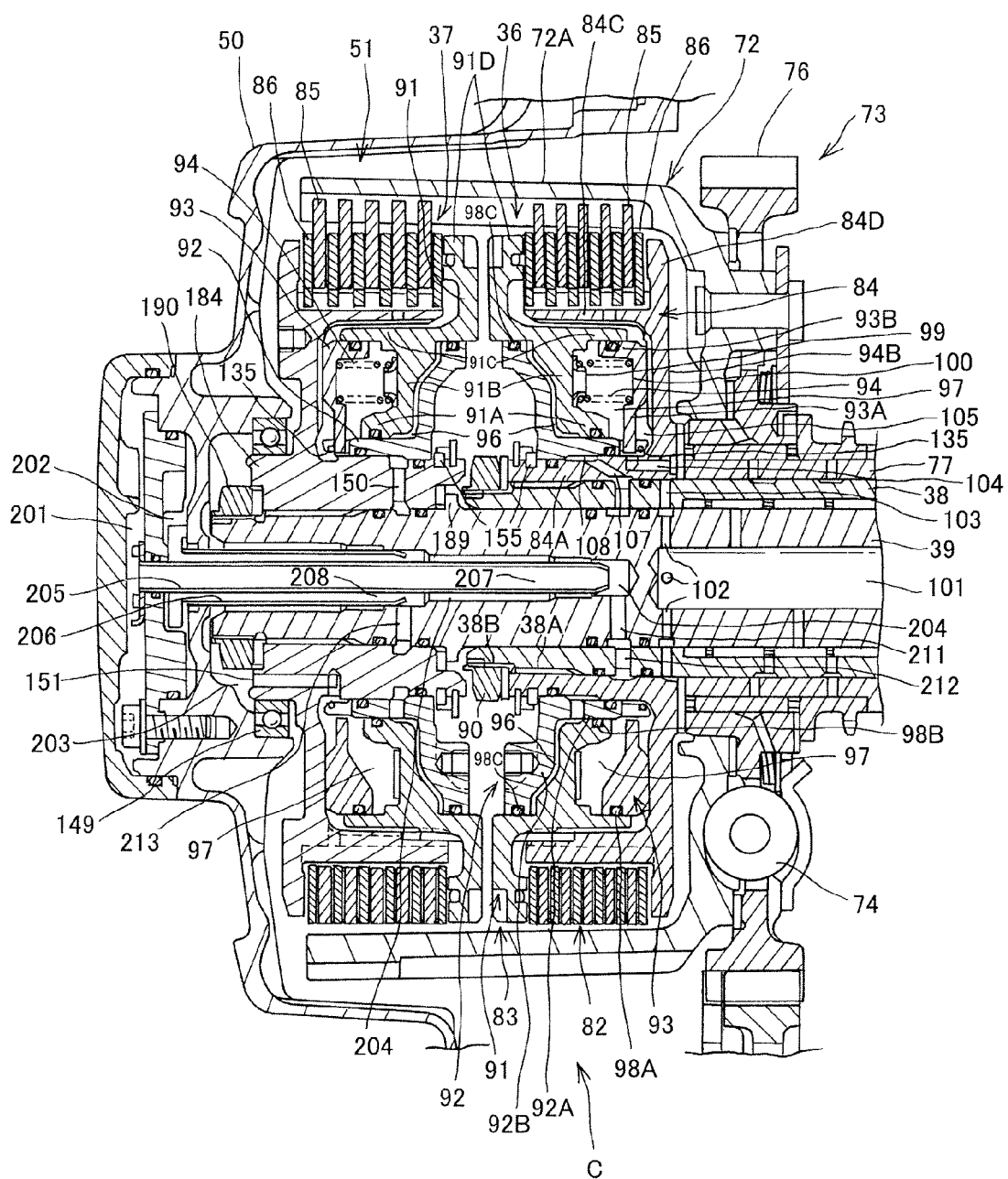
FIG. 3 is a sectional view of a clutch mechanism.

FIG. 3 is a sectional view of the clutch mechanism C.

In the clutch chamber 51, the other end of the second main shaft 39 is disposed projecting from the other end of the first main shaft 38, and the second hydraulic clutch device 37 is disposed on the other end side of the second main shaft 39, and the first hydraulic clutch device 36 is disposed on the other end side of the first main shaft 38.

Then, the power from the crank shaft 22 is inputted into a clutch outer 72 disposed in common on the first and second hydraulic clutch devices 36 and 37 through a primary speed reducing device 73 and a damper spring 74. The primary speed reducing device 73 has a driving gear (not shown) disposed on the crank shaft 22 and a driven gear 76 meshed with this driving gear, and the driven gear 76 is integrally connected to the clutch outer 72.

On the other end side of the first main shaft 38, in the vicinity of the first hydraulic clutch device 36, a transmission cylindrical shaft 77 supported on the outer peripheral face of the first main shaft 38 and capable of relative rotation with respect to the first main shaft 38 is disposed. The clutch outer and the driven gear 76 are fixed to the transmission cylindrical shaft 77 and capable of relative rotation with respect to the first main shaft 38.

Figure 4:
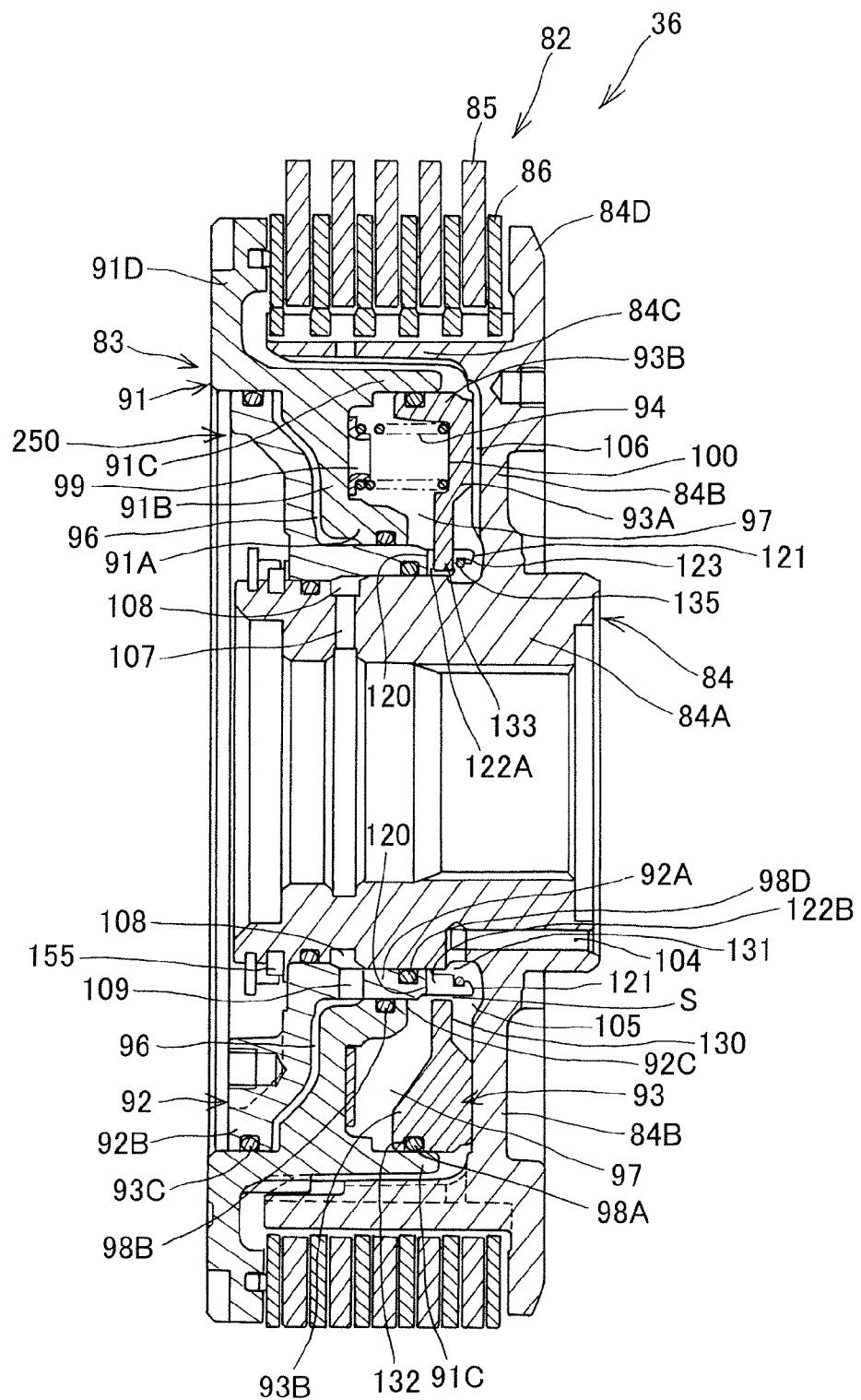
FIG. 4 is a sectional view of a first hydraulic clutch device.

FIG. 4 is a sectional view of the first hydraulic clutch device 36.

The first hydraulic clutch device 36 will be described below in detail. Also, the second hydraulic clutch device 37 is configured with substantially the same structure as that of the first hydraulic clutch device 36 and is disposed on the second main shaft 39 with the symmetrical positional relationship with respect to the first hydraulic clutch device 36 and thus, the detailed description of the second hydraulic clutch device 37 will be omitted.

As shown in FIGS. 3 and 4, the first hydraulic clutch device 36 has a clutch operation mechanism 82 and a clutch disengagement/engagement control mechanism 83 that switches the clutch operation mechanism 82 between disengagement and engagement.

The clutch operation mechanism 82 has the cylindrical clutch outer 72 having a bottom, a first clutch inner 84 contained in the clutch outer 72, a plurality of driving friction plates 85 (first friction plates) engaged with the clutch outer 72 incapable of relative rotation, a plurality of driven friction plates 86 (second friction plates) engaged with the first clutch inner 84 incapable of relative rotation, a pressure bearing plate portion 84D disposed on the first clutch inner 84 opposing the driving and driven friction plates 85 and 86, and a pressurizing plate portion 91D sandwiching the driving and driven friction plates 85 and 86 together with the pressure bearing plate portion 84D.

The clutch outer 72 (See FIG. 3) has a cylinder portion 72A surrounding the first clutch inner 84, and the cylinder portion 72A is disposed coaxially with the first and second main shafts 38 and 39 and integrally rotated with the driven gear 76.

The first clutch inner 84 has a cylindrical boss portion 84A joined to the first main shaft 38 incapable of relative rotation, a disk-shaped supporting plate portion 84B extending outward in the radial direction from one end of the boss portion 84A, and a cylinder portion 84C installed upright from the outer periphery of the supporting plate portion 84B and surrounding coaxially the boss portion 84A. The cylinder portion 84C of the first clutch inner 84 is formed coaxially with the cylinder portion 72A of the clutch outer 72 (FIG. 3). Also, the pressure bearing plate portion 84D is integrally formed by extending the outer periphery of the supporting plate portion 84B further in the radial direction.

The driving friction plates 85 and the driven friction plates 86 are arranged in plural between the cylinder portion 72A of the clutch outer 72 and the cylinder portion 84C of the first clutch inner 84 while alternately overlapping each other. The driving friction plates 85 are splined to the inner peripheral face of the cylinder portion 72A and rotated integrally with the clutch outer 72, while the driven friction plates 86 are splined to the outer peripheral face of the cylinder portion 84C and rotated integrally with the first clutch inner 84.

On the other end side of the first main shaft 38, a connecting shaft portion 38 in which a spline groove is formed in the outer periphery and a screw shaft portion 38B formed at a distal end of the connecting shaft portion 38A are disposed. The first clutch inner 84 is fixed by a nut 90 tightened into the screw shaft portion 38B in a state in which the boss portion 84A is splined to the spline groove of the first main shaft 38 and is incapable of relative rotation with respect to the first main shaft 38. Also, the first clutch inner 84 has its axial position regulated by being pressed to the side of the transmission cylindrical shaft 77.

Then, when the pressuring plate portion 91D is operated so that the driving and driven friction plates 85 and 86 are sandwiched and pressed between the pressuring plate portion 91D and the pressure bearing plate portion 84D, the clutch operation mechanism 82 is brought into the power transmission state. That is, the rotation of the crank shaft 22 is transmitted to the clutch outer 72 through the driven gear 76, and the rotation of the clutch outer 72 is transmitted to the first clutch inner 84 through the driving and driven friction plates 85 and 86, whereby the first main shaft 38 is rotated integrally with the first clutch inner 84.

The clutch disengagement/engagement control mechanism 83 is arranged opposite to the first clutch inner 84 and includes a clutch piston 91 disposed so that the driving and driven friction plates 85 and 86 are sandwiched between the clutch piston 91 and the first clutch inner 84, a piston guide 92 (clutch piston guide) arranged opposite to the clutch piston 91 on the side opposite to the first clutch inner 84, a canceller plate 93 disposed between the clutch piston 91 and the first clutch inner 84, and a return spring 94 arranged between the clutch piston 91 and the canceller plate 93 in a compressed state.

The piston guide 92 has a cylindrical piston guide portion 92A fixed to the outer peripheral face of the boss portion 84A of the first clutch inner 84 and an end wall portion 92B extended so as to form a disk shape in the radial direction from the end of the piston guide portion 92A. The outer peripheral face of the piston guide portion 92A is formed smooth and functions as a guide face 92C.

The piston guide 92 is disposed by having the inner peripheral face of the piston guide portion 92A fitted with the outer peripheral face of the boss portion 84A and its movement in the axial direction regulated by a stop ring 155 engaged with the outer peripheral face of the boss portion 84A.

The clutch piston 91 has a cylinder portion 91A disposed along the guide face 92C of the piston guide 92, a piston portion 91B extended so as to form the disk shape in the radial direction from the end of the cylinder portion 91A, an outer cylinder portion 91C disposed coaxially with the cylinder portion 91A on the outer periphery of the piston portion 91B, and the pressurizing plate portion 91D. The pressurizing plate portion 91D is a portion further extended so as to form the disk shape in the radial direction from the outer edge portion of the outer cylinder portion 91C.

The clutch piston 91 is disposed between the first clutch inner 84 and the piston guide 92, and a space surrounded by the piston portion 91B and the end wall portion 92B becomes a control hydraulic chamber 96 to which the operating oil of the clutch is supplied.

The canceller plate 93 is formed in a disk shape and is disposed so as to engage with the piston guide portion 92A of the piston guide 92 from the outer peripheral side. The canceller plate 93 is arranged between the supporting plate portion 84B of the first clutch inner 84 and the piston portion 91B of the clutch piston 91 and has a plate portion 93A opposing the piston portion 91B and a cylindrical outer wall portion 93B extending coaxially with the piston guide portion 92A from the outer edge portion of the plate portion 93A to the side of the piston portion 91B.

Also, at a distal end of the piston guide portion 92A of the piston guide 92, a clip 135 (locking tool) that holds an engaged state between the piston guide portion 92A and the canceller plate 93 by regulating the movement of the canceller plate 93 during assembling is disposed.

A space surrounded by the canceller plate 93 and the piston portion 91B becomes a hydraulic canceller chamber 97 to which the operating oil of the clutch is supplied. Between the outer wall portion 93B and the outer cylinder portion 91C, between the piston guide portion 92A and the cylinder portion 91A, and between the outer cylinder portion 91C and the outer peripheral face of the end wall portion 92B, oil seals 98A, 98B, and 98C are disposed, respectively, and the clutch piston 91 is supported in a liquid tight manner through the oil seals 98A, 98B, and 98C and is disposed slidably in the axial direction of the first main shaft 38.

In the hydraulic canceller chamber 97, the return spring 94 that urges the clutch piston 91 to the side of the control hydraulic chamber 96 is arranged. The return springs 94 are arranged in plural by being aligned annularly at substantially equal intervals from each other on a face of the disk-shaped piston portion 91B. In detail, the return spring 94 is a coil spring, and one end of each return spring 94 is supported by a spring seat 99 disposed on the piston portion 91B, while the other end is supported by a spring supporting hole 100 formed in the canceller plate 93.

In the first hydraulic clutch device 36, if the operating oil is supplied and a hydraulic pressure of the control hydraulic chamber 96 is increased, the clutch piston 91 is moved to the side of the hydraulic canceller chamber 97 against the urging force of the return spring 94 and with that, the driving and driven friction plates 85 and 86 are sandwiched and pressurized between the pressurizing plate portion 91D and the pressure bearing plate portion 84D, whereby the clutch operation mechanism 82 is engaged and brought into the power transmission state. Also, if the hydraulic pressure of the control hydraulic chamber 96 is lowered, the clutch piston 91 is moved to the side of the control hydraulic chamber 96 by the urging force of the return spring 94, whereby the clutch operation mechanism 82 is disengaged and brought into the state not transmitting the power.

Also, since the first hydraulic clutch device 36 is rotated integrally with the first main shaft 38, the operating oil of the control hydraulic chamber 96 subjected to the centrifugal force acts to move the clutch piston 91 to the side of the hydraulic canceller chamber 97. On the other hand, the operating oil of the hydraulic canceller chamber 97 subjected to the centrifugal force acts to move the clutch piston 91 to the side of the control hydraulic chamber 96. In this way, in the first hydraulic clutch device 36, since the force, which acts to the clutch piston 91, of the operating oil of the control hydraulic chamber 96 subjected to the centrifugal force can be offset by the force of the operating oil of the hydraulic canceller chamber 97 similarly subjected to the centrifugal force, the centrifugal force is prevented from affecting the operation of the first hydraulic clutch device 36.

As shown in FIG. 3, in the second main shaft 39, a first oil passage 101 having a bottom and a portion corresponding to the first hydraulic clutch device 36 as an inner end is disposed, and a lubricant supplied to this first oil passage 101 is led between the first and second main shafts 38 and 39 and also led to the hydraulic canceller chamber 97 of the clutch disengagement/engagement control mechanism 83 in the first hydraulic clutch device 36 as operating oil.

In order to lead the lubricant in the first oil passage 101 to the hydraulic canceller chamber 97, a plurality of oil holes 102 communicating with the inner end of the first oil passage 101 are disposed in the second main shaft 39, an oil hole 103 communicating with the oil hole 102 is disposed in the first main shaft 38, an oil path 104 communicating with the oil hole 103 is formed in the boss portion 84A of the first clutch inner 84, and the oil path 104 communicates with the hydraulic canceller chamber 97.

As shown in FIG. 4, between the plate portion 93A of the canceller plate 93 and the supporting plate portion 84B of the first clutch inner 84, an oil introduction portion 105 communicating with the oil path 104 is disposed. Also, on a face in contact with the canceller plate 93 in the face of the supporting plate portion 84B, a plurality of oil grooves 106 extending radially toward the outer peripheral side are formed. A part of the lubricant supplied to the oil path 104 flows in the oil grooves 106 through the oil introduction portion 105, passes between the cylinder portion 84C of the first clutch inner 84 and the outer cylinder portion 91C of the clutch piston 91 and is supplied to the driving and driven friction plates 85 and 86.

In the boss portion 84A of the first clutch inner 84, a plurality of oil paths 107 penetrating the boss portion 84A in the radial direction are formed, the oil path 107 communicates with an oil path 108 formed between the outer peripheral face of the boss portion 84A and the inner peripheral face of the piston guide portion 92A, and the oil path 108 communicates with an oil path 109 penetrating the piston guide portion 92A in the radial direction. The oil paths 109 are disposed in plural, and each of the oil paths 109 communicates with the control hydraulic chamber 96 of the first hydraulic clutch device 36.

As shown in FIG. 3, the second hydraulic clutch device 37 has a second clutch inner 184 fixed to the end of the second main shaft 39. The second hydraulic clutch device 37 is disposed by assembling the clutch piston 91, the piston guide 92, the canceller plate 93, the return spring 94, the clip 135, and the driving and driven friction plates 85 and 86 to the second clutch inner 184 and is configured similarly to the first hydraulic clutch device 36. The second hydraulic clutch device 37 is fixed in the axial direction by a projecting portion 189 formed on the outer peripheral face of the second main shaft 39 and a nut 190 tightened at the distal end of the second main shaft 39. The other end of the second main shaft 39 is supported by a ball bearing 149 disposed between the outer peripheral face of the second clutch inner 184 and the inner side face of the clutch cover 50.

Also, in the second clutch inner 184, an oil path 150 that supplies operating oil to the control hydraulic chamber 96 of the second hydraulic clutch device 37 and an oil path 151 that supplies operating oil to the hydraulic canceller chamber 97 of the second hydraulic clutch device 37 through the oil introduction portion 105 are formed.

On the inner face side of the clutch cover 50 and in the vicinity of the other end of the second main shaft 39, a first oil chamber 201, a second oil chamber 202, and a third oil chamber 203 are formed independently of each other. Also, in the second main shaft 39, a second oil passage 204 extending from the other end side in the axial direction in the second main shaft 39 is formed, and the second oil passage 204 is divided by a cylindrical first partition member 205 and a cylindrical second partition member 206 covering the outside of the first partition member 205.

The oil path in the first partition member 205 connects to the oil path 107 of the first clutch inner 84 through an oil path 211 penetrating from the second oil passage 204 outward in the radial direction and an oil path 212 penetrating the first main shaft 38 outward in the radial direction. Also, the oil path in the second partition member 206 connects to the oil path 150 of the second clutch inner 184 through an oil path 213 penetrating from the second oil passage 204 outward in the radial direction.

The first partition member 205 communicates with the first oil chamber 201 and constitutes a first control oil path 207 that supplies operating oil to the control hydraulic chamber 96 of the first hydraulic clutch device 36. The second partition member 206 communicates with the second oil chamber 202 and constitutes a second control oil path 208 that supplies operating oil to the control hydraulic chamber 96 of the second hydraulic clutch device 37. The first control oil path 207 and the second control oil path 208 are connected to the clutch actuator 132 (See FIG. 1), and by controlling hydraulic pressures of the first control oil path 207 and the second control oil path 208 by the first electromagnetic control valve 132A and the second electromagnetic control valve 132B, respectively, disengagement/engagement of the first and second hydraulic clutch devices 36 and 37 are switched.

Also, the third oil chamber 203 communicates with the oil path 151 of the second clutch inner 184, and operating oil is supplied to the hydraulic canceller chamber 97 of the second hydraulic clutch device 37 through the third oil chamber 203.

Figure 5:
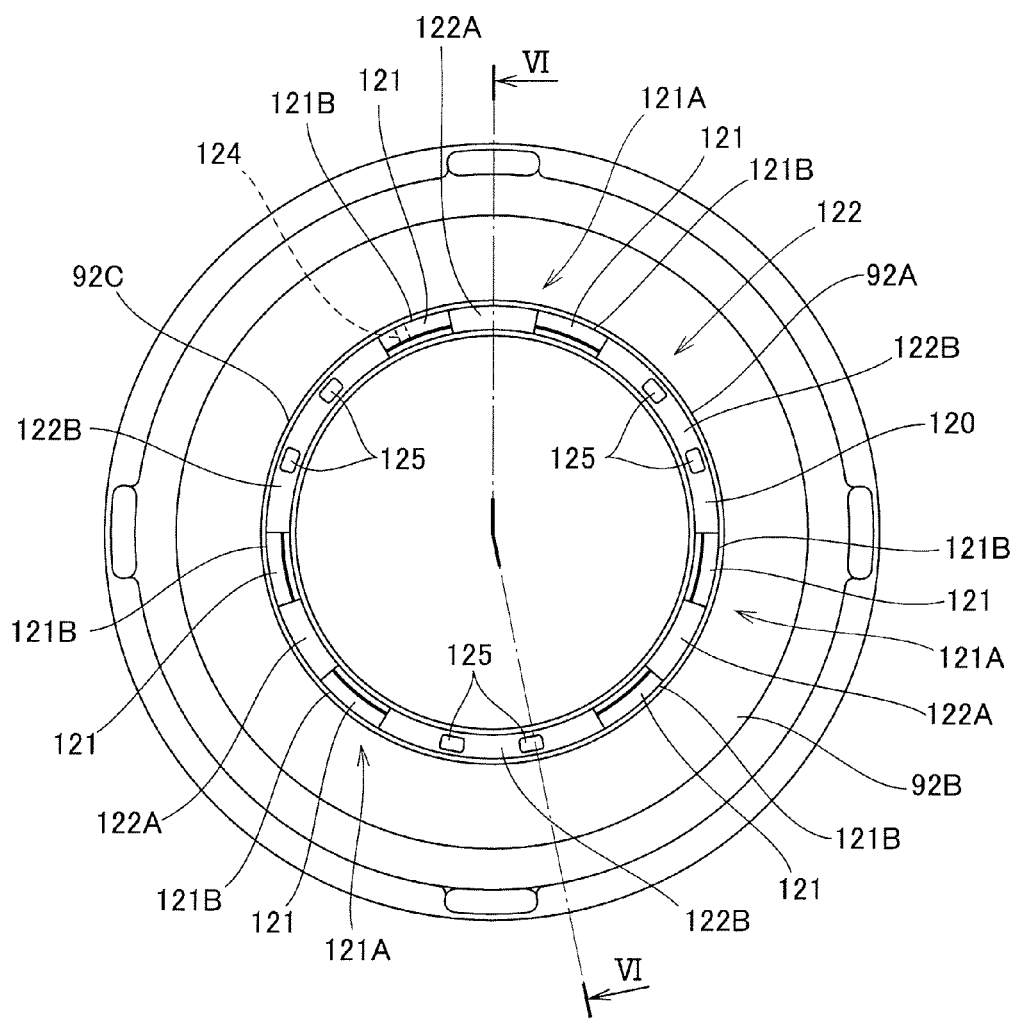
FIG. 5 is a plan view of a piston guide.
Figure 6:
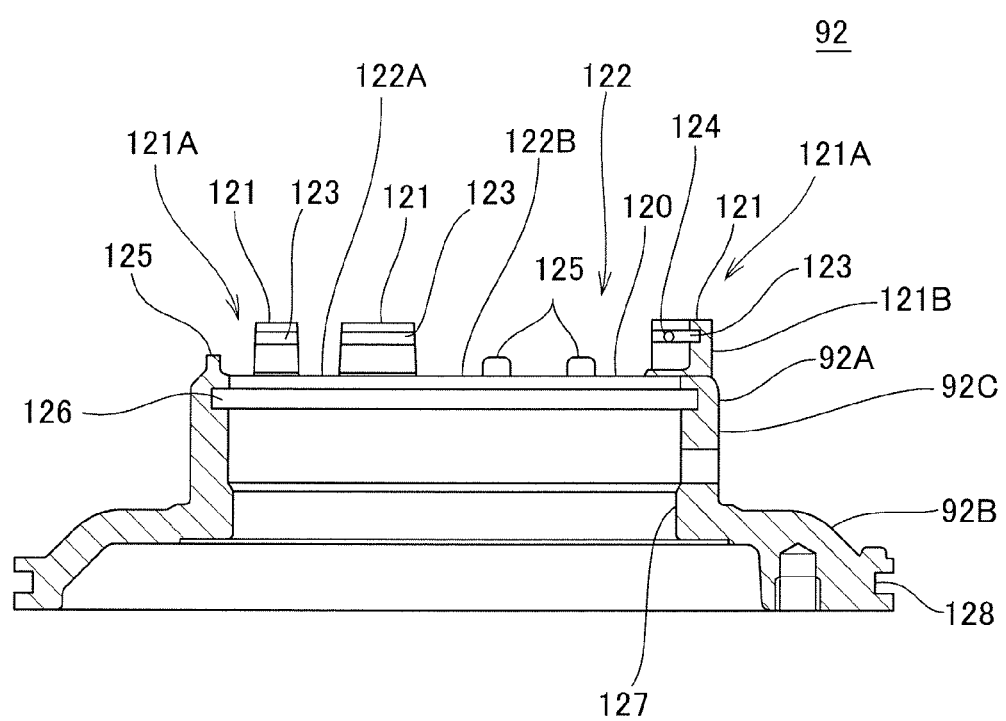
FIG. 6 is a VI-VI sectional view in FIG. 5.

FIG. 5 is a plan view of the piston guide 92. FIG. 6 is a VI-VI sectional view in FIG. 5.

As shown in FIGS. 4, 5, and 6, the piston guide 92 has the piston guide portion 92A extending to the side of the supporting plate portion 84B, and at a flat distal end portion 120 of the piston guide portion 92A, a plurality of projections 121 are installed upright. The projections 121 are formed so as to further extend a part of a wall portion of the cylindrical piston guide portion 92A in the axial direction. The projections 121 are arranged in six pieces in total at three spots so that two projections 121 arranged adjacently with a predetermined distance from each other as a pair of projection portions 121A. Also, an outer peripheral face 121B of the projection portion 121A is formed with a small diameter so as to dent to the inner peripheral side from the guide face 92C.

A portion on the distal end portion 120 where the projection 121 is not disposed is a notch portion 122, and the notch portion 122 has a first notch portion 122A that supports the canceller plate 93 and a second notch portion 122B adjacent to the first notch portion 122A. In detail, the projection portions 121A disposed in three pairs are arranged at equal intervals from each other so as to divide the distal end portion 120 formed circularly on a plan view into substantially equal three parts. A portion between the projections 121 disposed in a pair is disposed so as to cut away an intermediate portion in the circumferential direction of the two projections 121 arranged side by side and becomes the first notch portion 122A. Also, a portion where the projection 121 is not present between the projection portions 121A becomes the second notch portion 122B.

On the radially inner peripheral face of each projection 121, an engagement groove 123 formed so as to carve the projection 121 in the radial direction is disposed. Each engagement groove 123 is disposed along the radially inner face perpendicular to the axial direction of the piston guide portion 92A. Also, in one of the projections 121 disposed in six pieces, an engagement hole 124 penetrating the projection 121 in the radial direction is disposed. The engagement hole 124 is disposed in the engagement groove 123.

Also, on the second notch portion 122B, projection portions 125 projecting in the axial direction from the distal end portion 120 are formed in plural. Two of the projection portions 125 are arranged between each projection portion 121A and six projection portions in total are formed at intervals. Also, a distal end of each projection portion 125 is located below the engagement groove 123, that is, between the distal end portion 120 and the engagement groove 123.

In the inner peripheral face of the piston guide portion 92A, a seal groove portion 126 is formed, and in the seal groove portion 126, an oil seal 98D disposed between the boss portion 84A and the piston guide portion 92A is contained. Also, on the inner peripheral face of the piston guide portion 92A and in the vicinity of the end wall portion 92B, a stepped portion 127 having an inner diameter smaller by a step is formed, and the stepped portion 127 forms a part of the oil path 108. In the outer peripheral face of the end wall portion 92B, a seal groove portion 128 that contains the oil seal 98C is formed.

Figure 7:
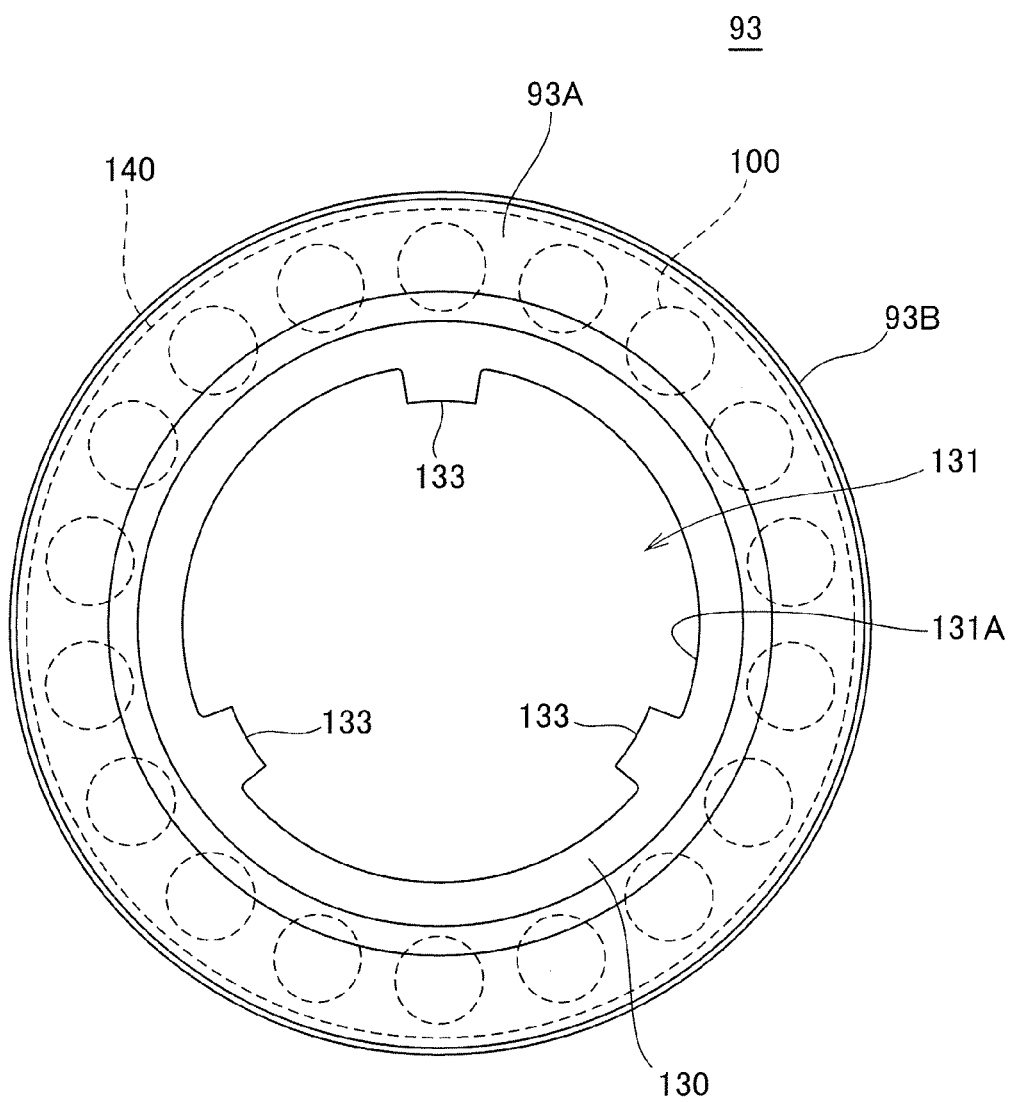
FIG. 7 is a plan view of a canceller plate.

FIG. 7 is a plan view of the canceller plate 93.

As shown in FIGS. 4 and 7, the canceller plate 93 has the plate portion 93A formed in the shape of a ring, and at the center of the plate portion 93A, a hole 131 through which the piston guide portion 92A is inserted is formed. In the plate portion 93A, in the vicinity of the edge portion of the hole 131, a stepped portion 130 dent by a step is disposed on the side of the hydraulic canceller chamber 97, and the oil introduction portion 105 are formed between the stepped portion 130 and the first clutch inner 84. Also, the spring supporting holes 100 are formed in plural side by side so as to form a circle in the plate portion 93A. In the outer peripheral face of the outer wall portion 93B, a seal groove portion 140 that contains the oil seal 98A is formed. The canceller plate 93 is pressed by the return spring 94 and supported by the supporting plate portion 84B in a state assembled to the first clutch inner 84.

From an inner peripheral face 131A (inner peripheral end) of the hole 131, projection portions 133 projecting toward the center of the canceller plate 93 are formed in plural. In detail, the projection portions 133 are formed at three spots so as to divide the inner peripheral face 131A into substantially equal three parts on a plan view and are disposed at positions corresponding to each of the first notch portions 122 of the piston guide 92.

Figure 8:
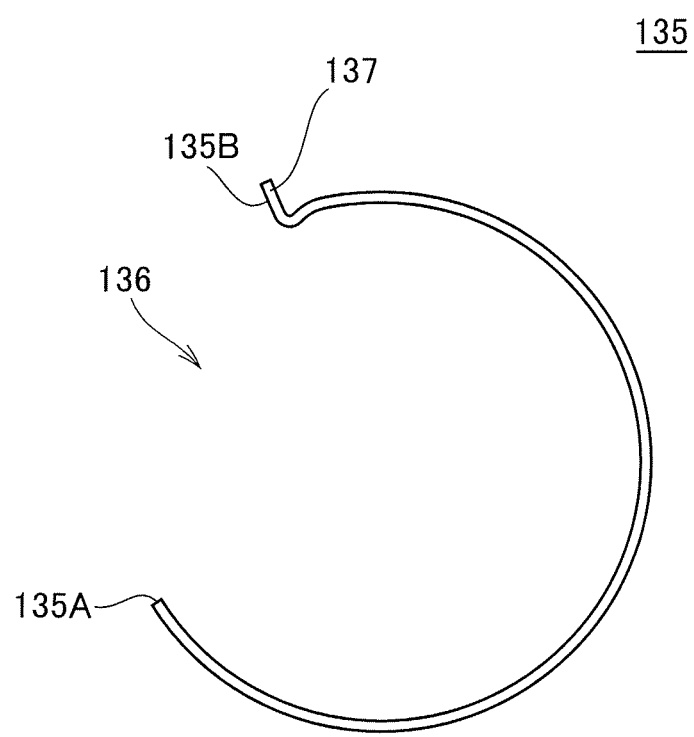
FIG. 8 is a plan view of a clip.

FIG. 8 is a plan view of the clip 135.

The clip 135 is a linear spring obtained by forming a linear material that is made of metal and has a circular section into a ring shape, and an interval is set between one end 135A and the other end 135B of the clip 135 so as to form a miter 136. The range in which the miter 136 is formed over an angular range larger than 90° in a state in which the clip 135 is not mounted when the clip 135 is seen as a circular shape on a plan view.

Also, at the other end 135B, the linear material is bent outward in the radial direction of the ring-shaped clip 135, and an engagement hook portion 137 in a hook shape is formed.

Figure 9:
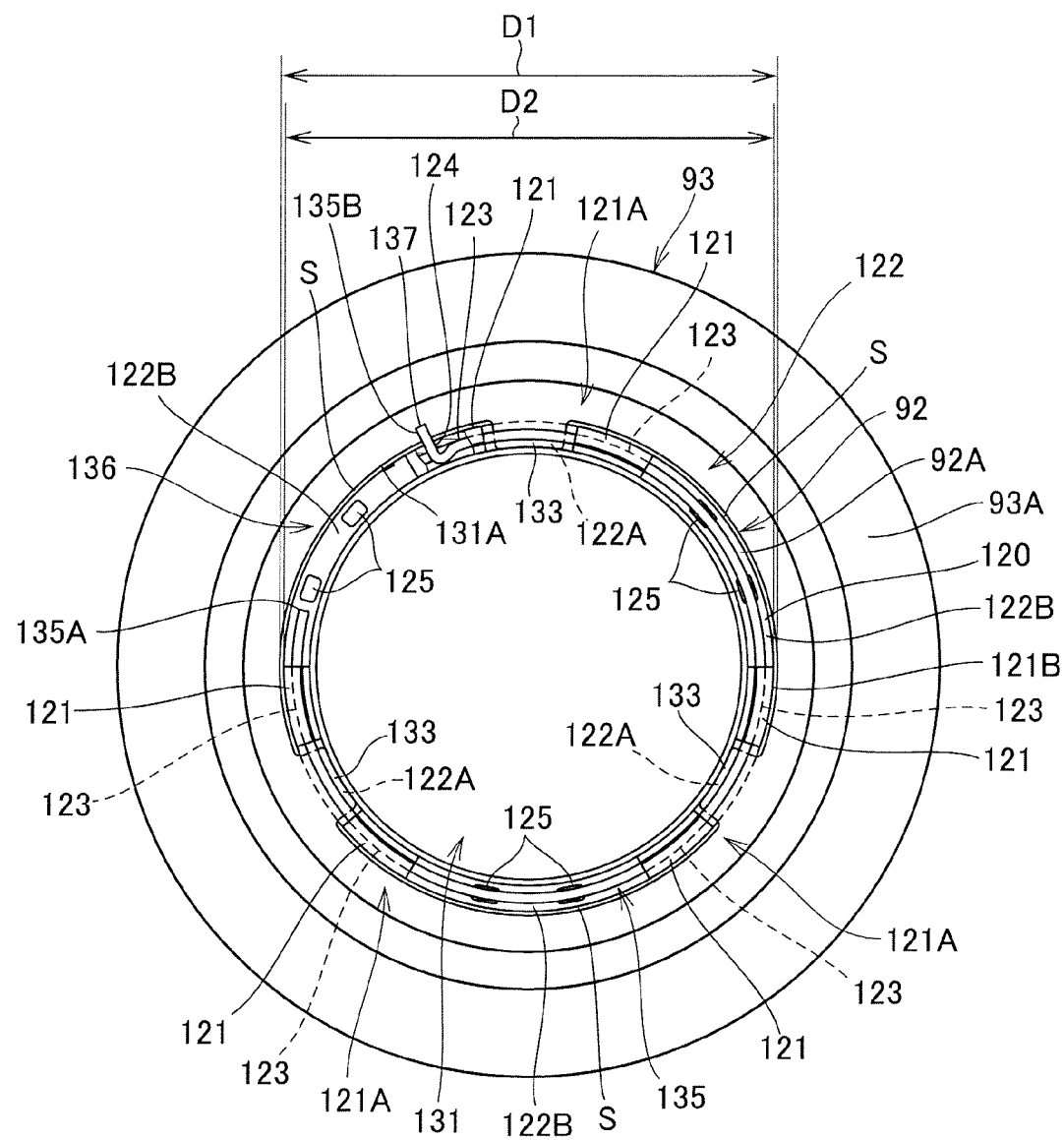
FIG. 9 is a partially cutaway plan view illustrating an engaged state between the canceller plate and the piston guide.

FIG. 9 is a partially cutaway plan view illustrating an engaged state between the canceller plate 93 and the piston guide 92.

As shown in FIGS. 4 and 9, the canceller plate 93 is assembled by inserting each projection 121 of the piston guide portion 92A through the hole 131. In this state, the three projection portions 133 of the canceller plate 93 are engaged with the first notch portions 122 of the piston guide portion 92A, respectively, from the outer peripheral side, and since each projection portion 133 is located between the projections 121 forming a pair, that is, in the first notch portion 122A, respectively, the canceller plate 93 is disposed incapable of relative rotation with respect to the piston guide 92. However, between the first notch portion 122 and each projection portion 133, a clearance for assembling is provided, and the canceller plate 93 is relatively rotated by this clearance.

The clip 135 is set on the engagement groove 123 of each projection 121 from the inner peripheral face side of the piston guide portion 92A so as to be engaged with the engagement groove 123. That is, the clip 135 engaged with the engagement groove 123 is disposed annularly substantially in parallel with the face of the distal end portion 120 in a state with a predetermined interval from the face of the distal end portion 120. Then, the canceller plate 93 has its movement in the axial direction of the piston guide portion 92A regulated by engagement of each projection portion 133 between the distal end portion 120 and the clip 135.

Also, the clip 135 is positioned by engagement of the engagement hook portion 137 with the engagement hole 124 in the projection 121 from the inner peripheral side and is made incapable of relative rotation with respect to the piston guide 92. Thus, rotation of the clip 135 in the engagement groove 123 with rotation of the piston guide 92 can be prevented. Moreover, the clip 135 is reliably fitted in the engagement groove 123 with an urging force (binding force) stretching outward in the radial direction in a diameter-reduced state, and an opening range of the miter 136 is reduced to 90° or less.

In this embodiment, since the clip 135 is disposed by being engaged with the engagement groove 123 formed in the inner peripheral face of the piston guide 92 so that the clip 135 is supported from the outer peripheral face, if the piston guide 92 is rotated with driving of the motorcycle, the clip 135 is not removed by the centrifugal force. As a result, the binding force of the clip 135 can be made smaller, and the clip 135 can be easily deformed and attached to the engagement groove 123, whereby the workability of assembling of the hydraulic clutch device can be improved.

In the first notch portion 122A, the projection portion 133 is engaged between the distal end portion 120 and the clip 135, and as shown in FIG. 4, the thickness of the projection portion 133 is formed thinner than the interval between the distal end portion 120 and the clip 135, whereby the operating oil can pass through the first notch portion 122A and flow in/out of the hydraulic canceller chamber 97. Also, in the second notch portion 122B, the projection portion 133 is not engaged between the distal end portion 120 and the clip 135, and the second notch portion 122B is a void through which the operating oil can pass. Particularly, since the projection portion 133 does not affect the flow of the operating oil in the second notch portion 122B, a large quantity of the operating oil can pass through the second notch portion 122B and smoothly flow in/out of the hydraulic canceller chamber 97.

Also, as shown in FIG. 9, the diameter of the base circle of the portion where the projection portions 133 are disposed, that is, a diameter D1 of the inner peripheral face 131A of the hole 131 in the canceller plate 93 is formed larger than the outer diameter of the portion where the piston guide portion 92A is engaged with the canceller plate 93, that is, an outer diameter D2 of the distal end portion 120 including the diameter of the outer peripheral face 121B of each projection portion 121A. Thus, the operating oil can pass through a gap S between the inner peripheral face 131A of the hole 131 and the outer peripheral face 121B as well as the inner peripheral face 131A of the hole 131 and the outer peripheral face of the distal end portion 120 and flow in/out of the hydraulic canceller chamber 97.

In this embodiment, the operating oil can pass through the first notch portion 122A, the second notch portion 122B, and the gap S and flows in/out of the hydraulic canceller chamber 97, and using the portion where the canceller plate 93 is engaged with the piston guide 92, the operating oil can be made to flow in/out of the hydraulic canceller chamber 97 without providing a particular oil path.

When the engine E is started, the operating oil is supplied by the oil pump 144 to the hydraulic canceller chamber 97 through a plurality of oil paths, and in a state in which the engine E is operated, each hydraulic canceller chamber 97 is usually filled with the operating oil. In a case where the first hydraulic clutch device 36 (or the second hydraulic clutch device 37) is to be brought into the engaged state, the operating oil is supplied to the control hydraulic chamber 96, and when the clutch piston 91 is moved by the operating oil to the side of the hydraulic canceller chamber 97, the capacity of the hydraulic canceller chamber 97 is reduced, and a part of the operating oil in the hydraulic canceller chamber 97 passes through the first notch portion 122A, the second notch portion 122B, and the gap S and is quickly discharged from the hydraulic canceller chamber 97. Also, in a case where the first hydraulic clutch device 36 (or the second hydraulic clutch device 37) is to be brought into the disengaged state, too, the operating oil is quickly supplied to the hydraulic canceller chamber 97 through the first notch portion 122A, the second notch portion 122B, and the gap S. In this way, the operating oil can be made to flow in/out of the hydraulic canceller chamber 97 quickly through the first notch portion 122A, the second notch portion 122B, and the gap S, and engagement and disengagement of the first hydraulic clutch device 36 and the second hydraulic clutch device 37 can be quickly switched, whereby time required for the transmission operation can be reduced.

Here, referring to FIG. 4, an assembling procedure of the clutch piston 91, the piston guide 92, and the canceller plate 93 in the first hydraulic clutch device 36 will be described.

First, a single piece of the clutch piston 91 is prepared, and the piston guide portion 92A of the piston guide 92 is fitted in the inner peripheral face of the cylinder portion 91A. Then, after the return spring 94 is set in each spring seat 99 of the clutch piston 91, the canceller plate 93 is engaged with the projection 121 of the piston guide portion 92A, the return spring 94 is pressed by the canceller plate 93, and the clip 135 is engaged with the engagement groove 123 in a state in which the return spring 94 is compressed. As a result, a small assembly 250 in which the clutch piston 91, the piston guide 92, the canceller plate 93, and the return spring 94 are integrally assembled is formed. At this time, since the binding force of the clip 135 is set small, the clip 135 can be easily deformed and engaged with the engagement groove 123. That is, since the clip 135 is supported by the engagement groove 123 from the outer peripheral side and there is no need to increase the binding force to resist the centrifugal force, the binding force of the clip 135 can be set to a small binding force of such a degree that an assembling worker can easily compress the diameter with fingers without using a tool, for example.

Also, the clip 135 has its movement to the side of the distal end portion 120 regulated by each projection portion 125 (See FIG. 9) formed in the distal end portion 120. Thus, the clip 135 is prevented from entering too deep into the side of the distal end portion 120 during the assembling work, and the workability of assembling is good. Moreover, by setting the interval between the projection portions 125 and the interval between each projection portion 125 and the adjacent projection 121 smaller than the width of each projection portion 133, the projection portion 133 is prevented from being assembled to the second notch portion 123B, whereby misassembling can be prevented.

In the state of the small assembly 250, each projection portion 133 at three sports on the canceller plate 93 is engaged with each first notch portion 122A and is pressed onto the clip 135 by a repulsive force of the return spring 94. That is, since the axial movement of the canceller plate 93 is regulated by the clip 135, in the state of the small assembly 250, a state in which the return spring 94 is compressed by the canceller plate 93 can be maintained.

After that, by fitting the piston guide portion 92A of the piston guide 92 with the outer peripheral face of the boss portion 84A of the first clutch inner 84 and by attaching a stop ring 155 to the boss portion 84A, assembling of the small assembly 250 to the first clutch inner 84 is completed. In this way, since the small assembly 250 in which the return spring 94 is compressed in advance is attached to the first clutch inner 84, there is no need to compress the return spring 94 when the small assembly 250 is assembled to the first clutch inner 84, and assembling work is easy.

As described above, according to the embodiment to which the present invention is applied, since the clip 135 that regulates the movement of the canceller plate 93 is disposed so as to be engaged in the engagement groove 123 of each projection 121 in the notch portion 122 of the piston guide 92 so that the clip 135 is supported by the engagement groove 123 from the outer peripheral side, the clip 135 is not removed by the centrifugal force when the piston guide 92 is rotated. Thus, the binding force of the clip 135 can be made smaller, and the workability of assembling of the first and second hydraulic clutch devices 36 and 37 can be improved.

Also, since the clip 135 is a linear spring, the clip 135 can be deflected and easily assembled to the piston guide 92, and weight reduction can be promoted.

Also, by inserting the engagement hook portion 137 of the clip 135 in the engagement hole 124 of the canceller plate 93, the position of the clip 135 can be regulated, and the position of the clip 135 can be regulated, and a detent of the clip 135 can be provided with a simple structure.

Moreover, since the diameter D1 of the base circle of the projection portion 133 of the canceller plate 93 is larger than the outer diameter D2 of the portion where the piston guide 92 is engaged with the canceller plate 93, the gap S is formed between the inner peripheral face 131A of the hole 131 and the piston guide 92, and the operating oil in the hydraulic canceller chamber 97 can pass through the gap S. Therefore, there is no need to particularly provide an oil path through which the operating oil of the hydraulic canceller chamber 97 is made to pass, and the structure can be simplified. Also, since the operating oil can be made to flow in/out of the hydraulic canceller chamber 97 quickly through the gap S, and the engagement and disengagement of the first and second hydraulic clutch devices 36 and 37 can be switched quickly, time required for the transmission operation can be reduced.

Furthermore, since the second notch portion 122B is a void where the projection portion 133 of the canceller plate 93 is not engaged, the operating oil of the hydraulic canceller chamber 97 can pass through this void, and the operating oil of the hydraulic canceller chamber 97 can pass easily. As a result, since the operating oil can be made to flow in/out of the hydraulic canceller chamber 97 quickly through the second notch portion 122B, and the engagement and disengagement of the first and second hydraulic clutch devices 36 and 37 can be switched quickly, time required for the transmission operation can be reduced.

The above embodiment shows one mode to which the present invention is applied, and the present invention is not limited to the above embodiment.

In the above embodiment, the pressure bearing plate portion 84D is described as being disposed on the first clutch inner 84 but the present invention is not limited to that, and the pressure bearing plate portion may be disposed on the clutch outer 72 side so as to sandwich and to pressurize the driving and driven friction plates 85 and 86 between this pressure bearing plate portion and the pressurizing plate portion 91D. Also, it is needless to say that the other detailed configurations may be arbitrarily changed.

What is claimed is:

1. A hydraulic clutch device comprising:
    a clutch outer;
    a clutch inner coaxially surrounded by the clutch outer and rotatably movable therein when the clutch device is disengaged;
    a plurality of friction plates;
    a clutch piston that sandwiches the friction plates together with either one of the clutch inner or the clutch outer and moves to the side to pressurize the friction plates in accordance with an increase in a hydraulic pressure in a control hydraulic chamber;
    a clutch piston guide provided separate from, and disposed inside of the clutch outer in fixed relation to the clutch inner for concurrent rotation therewith, the clutch piston guide configured so that the control hydraulic chamber is formed between the clutch piston guide and the clutch piston; and
    a canceller plate that forms a hydraulic canceller chamber on the side opposite to the control hydraulic chamber across the clutch piston, wherein:
    the canceller plate has a projection portion disposed on an inner peripheral end thereof and the clutch piston guide has a notch portion disposed at the end thereof, the projection portion and the notch portion being engaged with each other and assembled,
    a base circle of the projection portion is larger than an outer diameter of a portion where the clutch piston guide is engaged with the canceller plate,
    a gap, through which operating oil can pass to the canceller chamber, is formed between the canceller plate and the clutch piston guide, and
    a locking tool is disposed and engaged in an inner peripheral groove disposed radially inside of the projection portion and regulates axial movement of the canceller plate with respect to the clutch piston guide.

2. The hydraulic clutch device according to claim 1, wherein the locking tool is a linear spring.

3. The hydraulic clutch device according to claim 2, wherein the locking tool has an engagement hook portion that is inserted into an engagement hole formed in the inner peripheral face of the canceller plate.

4. The hydraulic clutch device according to claim 1, wherein the notch portion has a void where the projection portion is not engaged.

5. The hydraulic clutch device according to claim 1, wherein a thickness of the projection portion is formed thinner than an interval between the end of the clutch piston guide and the locking tool.

6. The hydraulic clutch device according to claim 1, wherein:
the friction plates include a plurality of first friction plates engaged with the clutch outer incapable of relative rotation and a plurality of second friction plates arranged alternately overlapping the first friction plates and engaged with the clutch inner incapable of relative rotation,
the clutch piston has a pressurizing plate portion, and
a pressure bearing plate portion is disposed on either one of the clutch inner or the clutch outer so that the first and second friction plates arranged mutually overlapping are sandwiched between the pressure bearing plate portion and the pressurizing plate portion.

7. A hydraulic clutch device comprising:
a clutch outer;
a clutch inner coaxially surrounded by the clutch outer and rotatably movable therein when the clutch device is disengaged;
a plurality of first friction plates operatively attached to the clutch outer, and a plurality of second friction plates operatively attached to the clutch inner;
a clutch piston that sandwiches the first and second friction plates together with either one of the clutch inner or the clutch outer and moves to the side to pressurize the friction plates in accordance with an increase in a hydraulic pressure in a control hydraulic chamber;
a clutch piston guide provided separate from, and disposed inside of the clutch outer in fixed relation to the clutch inner for concurrent rotation therewith, the clutch piston guide configured so that the control hydraulic chamber is formed between the clutch piston guide and the clutch piston; and
a canceller plate that forms a hydraulic canceller chamber on the side opposite to the control hydraulic chamber across the clutch piston, wherein:
the canceller plate has a plurality of integrally formed projection portions disposed on an inner peripheral end thereof, and the clutch piston guide has a plurality of notch portions formed therein and disposed at the end thereof, the projection portions and the notch portions being engaged with each other and assembled,
and
a locking tool is disposed and engaged in an inner peripheral groove disposed radially inside of the projection portions, the locking tool configured to regulate axial movement of the canceller plate with respect to the clutch piston guide.

8. The hydraulic clutch device according to claim 7, wherein the locking tool is a linear spring.

9. The hydraulic clutch device according to claim 8, wherein the locking tool has an engagement hook portion that is inserted into an engagement hole formed in the inner peripheral face of the canceller plate.

10. The hydraulic clutch device according to claim 7, wherein the notch portion has a void where the projection portion is not engaged.

11. The hydraulic clutch device according to claim 7, wherein a base circle of the projection portion is larger than an outer diameter of a portion where the clutch piston guide is engaged with the canceller plate,
and wherein a gap, through which operating oil can pass to the canceller chamber, is formed between the canceller plate and the clutch piston guide.

12. The hydraulic clutch device according to claim 7, a thickness of the projection portion is formed thinner than an interval between the end of the clutch piston guide and the locking tool.

13. The hydraulic clutch device according to claim 7, wherein:
the clutch piston has a pressurizing plate portion, and
a pressure bearing plate portion is disposed on either one of the clutch inner or the clutch outer so that the first and second friction plates arranged mutually overlapping are sandwiched between the pressure bearing plate portion and the pressurizing plate portion.

* * * * *